United States Patent [19]
Wilke

[11] Patent Number: 5,471,974
[45] Date of Patent: Dec. 5, 1995

[54] GAS POWER PLANT

[75] Inventor: Rudeger Wilke, Darien, Ill.

[73] Assignee: Savage Bros. Co., Elk Grove Village, Ill.

[21] Appl. No.: 352,570

[22] Filed: Dec. 9, 1994

[51] Int. Cl.⁶ ........................................... F24H 1/00
[52] U.S. Cl. .................. 126/373; 126/374; 126/343.5 A
[58] Field of Search .................................. 126/373, 374, 126/343.5 R, 343.5 A

[56] References Cited

U.S. PATENT DOCUMENTS 1,385,545   7/1921   Healy .................. 126/343.5 A
4,102,330   7/1978   Hutchinson ............... 126/374

Primary Examiner—Carroll B. Dority
Attorney, Agent, or Firm—Paul H. Gallagher

[57] ABSTRACT

A casing having an upper compartment and a lower compartment. The upper compartment includes a burner and a structure for accommodating a candy kettle. The lower compartment incorporates a pressurized fuel means, including a blower, a manifold with an air-fuel mixer therein. The manifold is of large capacity and size, and is constructed for occupying a relatively small space, thereby providing high capacity burner means for a small candy cooker.

9 Claims, 3 Drawing Sheets

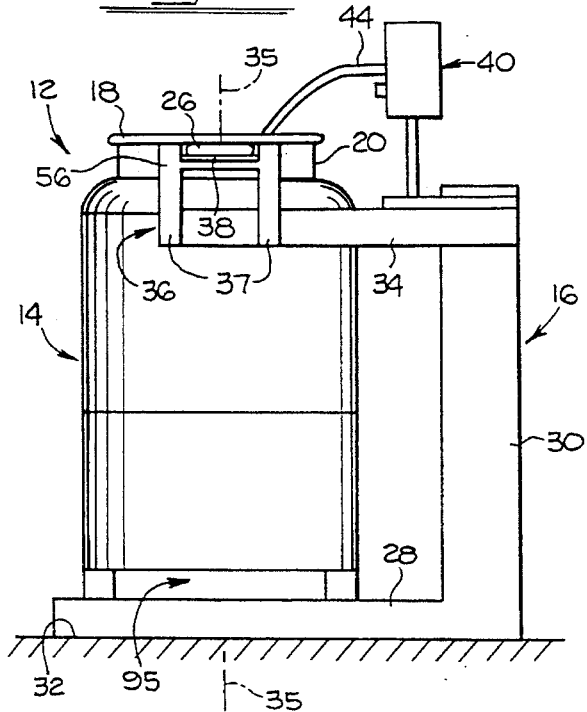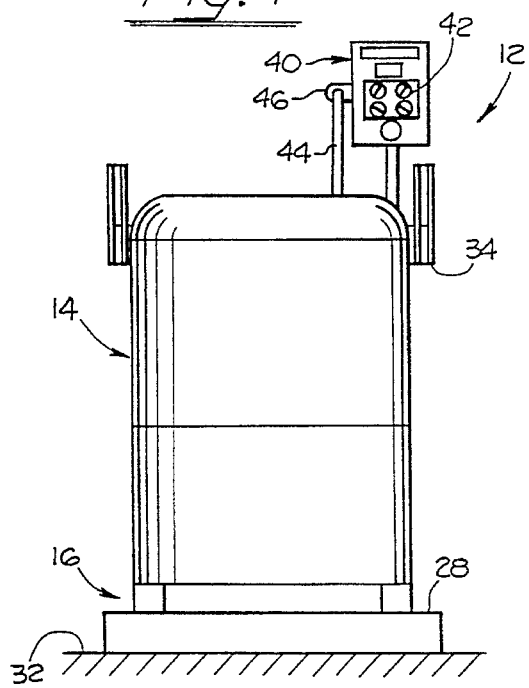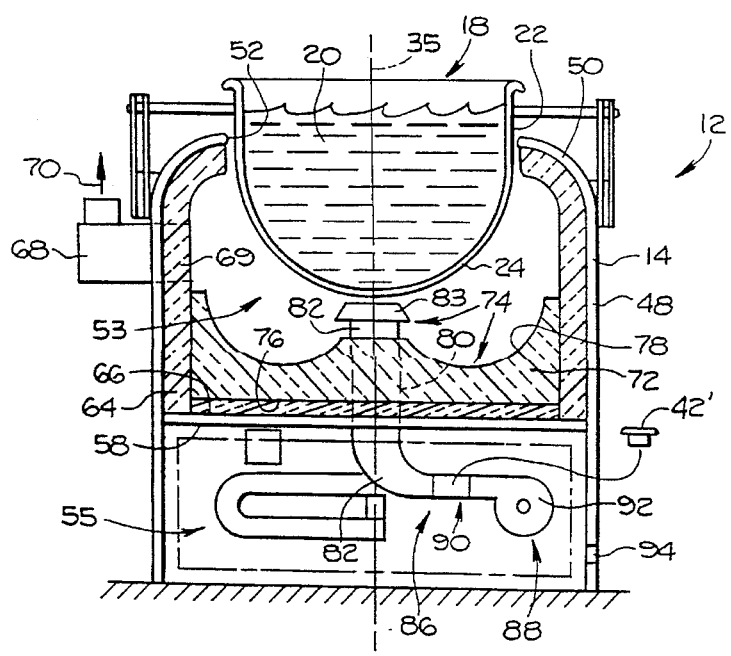

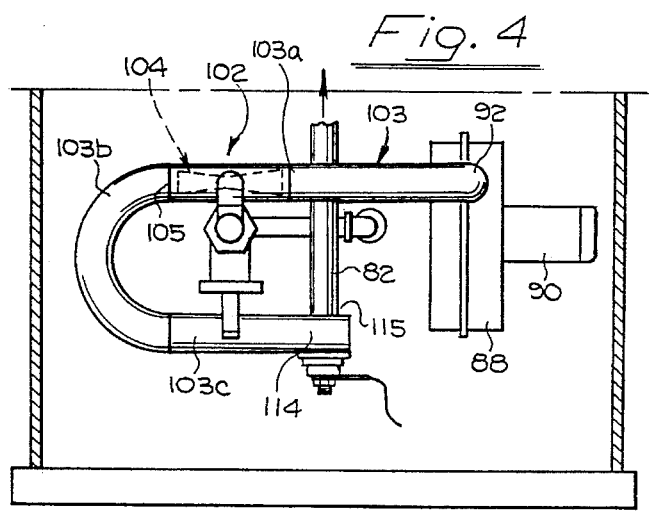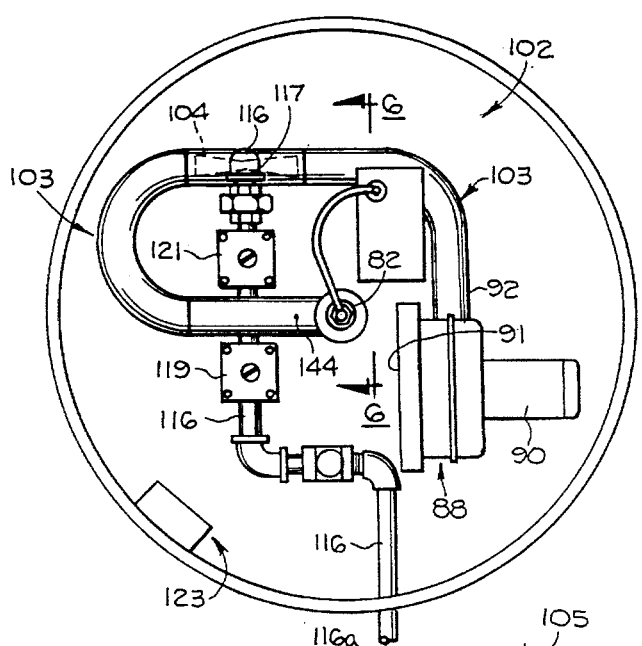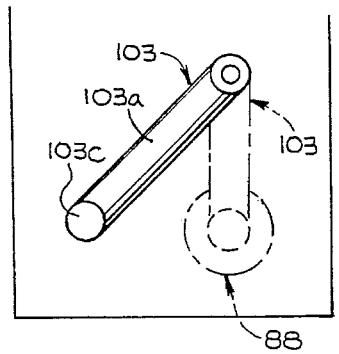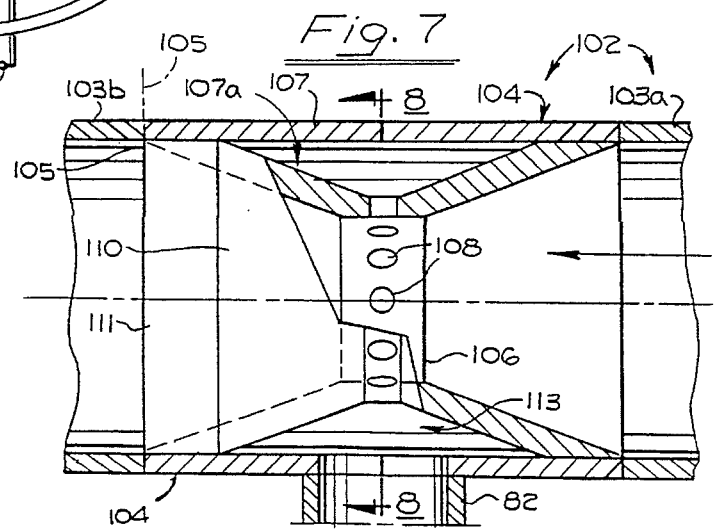

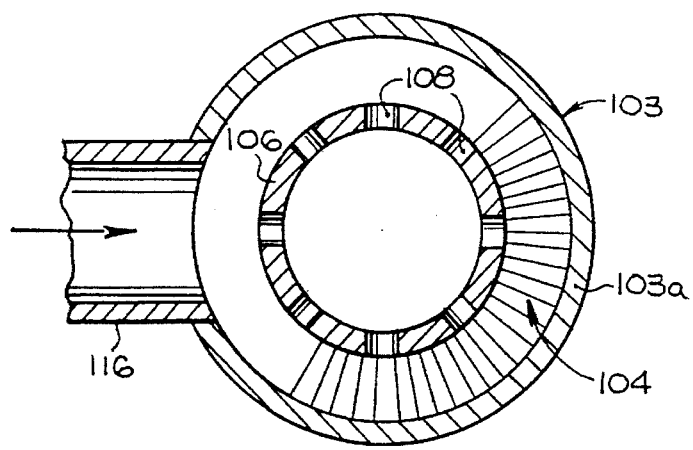
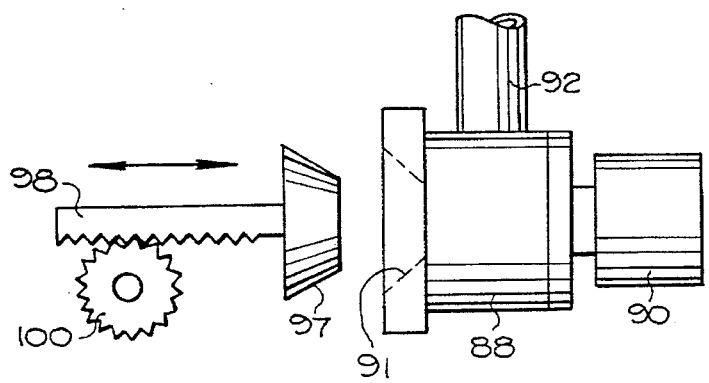
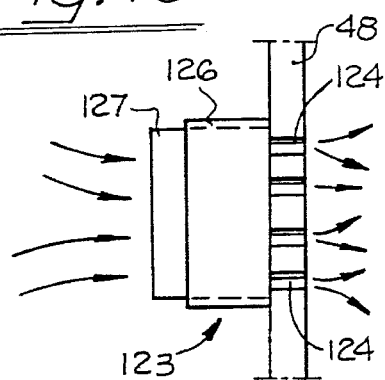

GAS POWER PLANT

CROSS REFERENCE

Pending application by the same inventor, titled Gas Power Plant, Ser. No. 352,607 Dec. 9, 1994.

SUMMARY OF THE INVENTION

The invention resides in the general field of gas power plants. The present device, as an example of a specific embodiment of the broad invention, is adapted to cooking candy, as will be referred to in detail hereinbelow.

A broad object of the invention is to provide a gas power plant of great capacity while being very compact and of small dimensions.

Another main object is to provide such a power plant that is of great capacity and adaptable to a wide variety of circumstances and conditions, including selectively small and large installations, and including the capability of later adding on additional components on an original basic unit.

Another great feature is its efficiency, including, the use of infra red heat in addition to convection heat, and its capability of concentrating great quantities of heat in a small area or space when desired.

The device includes an unusual design capable of employing elements of great capacity and size, such as manifold elements in an unusually compact arrangement.

The device further includes a novel fuel mixer which actually increases the firmness and strength of the manifold.

BRIEF DESCRIPTION OF THE INDIVIDUAL FIGURES OF THE DRAWINGS

FIG. 1 is a front elevational view of a candy cooker made according to the present invention.

FIG. 2 is a side elevational view.

FIG. 3 is a vertical sectional view.

FIG. 4 is a large scale vertical sectional view of the lower part of the cooker.

FIG. 5 is a horizontal view taken at line 5—5 of FIG. 1, showing the lower compartment.

FIG. 6 is a transverse vertical sectional view oriented according to line 6—6 of FIG. 5, but showing only certain elements at that location.

FIG. 7 is a longitudinal sectional view of the fuel mixer.

FIG. 8 is a sectional view taken at line 8—8 of FIG. 7.

FIG. 9 is a detailed view of the air inlet valve of the blower.

FIG. 10 is a view of one of the elements used in exhausting heated air from the lower compartment.

DETAILED SPECIFICATION

As noted above, the invention is of such broad scope as to be adaptable to and operable in a wide range of capacity and heating conditions. The present disclosure is a candy cooker, representing a relatively smaller installation.

In referring to the cross reference application identified above, it is stated that both that application and the present application relate to components designed for a single candy cooker, although directed to various main phases thereof. In the cross reference application the invention resides in the burner itself and elements directly incorporated in and relating thereto, while in the present application the invention is directed to the fuel mixing and related elements and features.

FIGS. 1 and 2 show a candy cooker which in overall construction and appearance is identical to that of the cross reference application, and for convenience the elements and components that are common to the two applications are described first.

The candy cooker is identified as a whole at 12 and includes a casing 14, a stand 16, FIGS. 2 and 3 showing a kettle 18 for containing a batch of candy 20. This kettle is a known item used in candy making, made of copper and being cylindrical at the top at 22, and having a hemispherical bottom 24. The kettle is provided with loop handles 26 at opposite sides, these handles being utilized in mounting it in the stand 16 and for carrying it.

The stand 16 which may also be referred to as a frame may be of suitable structure including a base 28 and a column or standard 30 rising therefrom. The stand 16 may be normally stationary, resting on the floor 32, but it may be provided with casters or wheels, if desired, and the casing 14 normally rests on the base 28. Included in the stand 16 are a pair of arms 34 which straddle the casing and extend beyond the central axis 35 thereof as will be referred to again. Mounted on the arms are supports 36 each having spaced upright side elements 37 and a cross bar 38 adjacent to but spaced downwardly from the top of the side elements. These supports are for supporting the handles 26 of the kettle. This support of the kettle is critical from the standpoint of preventing the escape of heat, as will be referred to again hereinbelow.

The stand or frame 16 is utilized for mounting various other instrumentalities such as a control box 40 having various elements 42 for controlling various operating components of the device. One of these elements, identified 42' will be found in FIG. 3 and referred to again hereinbelow.

A temperature sensor element 44 is swingably mounted at 46 on the control box and is operably connected with a temperature indicating element or thermometer in the control box. This sensing element in the shape of a rod, is swingable downwardly into a lower position in which its sensing tip extends into the candy batch, and to an upper position clear of the casing to enable the kettle to be inserted in and removed from the casing.

The casing 14 is preferably cylindrical, and includes a shell or skin 48 having an inturned annular portion 50 at the top defining a circular kettle opening 52 (FIG. 3).

The cooker includes an upper compartment 53 and a lower compartment 55, containing the burner component and fuel component respectively. The kettle, when put in the opening 52 for the cooking step, extends down into the upper compartment, in a cooking position, and this relationship is pointed out in connection with the burner component which is also in the upper compartment, and is directly under the kettle.

In the candy cooking operations, the kettle is handled and transported by other equipment, such as a truck, to and from the candy cooker and in placing it in the casing, it is inserted in the central hole 52 with the handles 26 engaging and resting on the supports 36. The hole 52 is pre-dimensioned to receive the kettle in a position in which the kettle nearly touches the rim 52 of the hole, but it is spaced therefrom only slightly, so that only negligible gases, and heat, escape therethrough, which is an important feature of the invention. Shims 56 may be utilized, placing them on the cross bars 38 for supporting the kettle at the exact height desired for the proximity relation with the edge of the hole 52 as referred to above.

The casing 14 is provided with a transverse horizontal partition or space divider 58, which divides the casing into the upper and lower compartments referred to, which may be positioned approximately at a midpoint, in height. In the upper compartment a liner of heat insulation 64 lines the side wall of the shell, up to the edge of the hole 52, and a layer 66 of heat insulation is positioned on the partition or floor.

In connection with the control of hot gases from the candy cooker, the casing is provided with an outlet duct 68 leading at 69 from the upper compartment for conducting those gases, as indicated by the arrow 70, to controlled areas, in contrast to releasing the heated gases into the surroundings. This facilitates control of the surrounding temperatures, as for example when the area is air conditioned and the escape of heat into that area is undesired, or in another situation where additional heat is desired in other areas. Thus considering the minute space between the kettle and marginal edge of the top opening, substantially all of the heated gases from the upper compartment are emitted through the outlet duct 68.

As shown in detail in the cross referenced application, a burner 74 is positioned in the upper compartment, and as indicated above is positioned directly under the kettle. This latter relationship is covered in detail in the cross referenced application, and therefore the disclosure of that burner in the present case will be held to a minimum. The burner includes refractory element 72 with an upper firing surface, which rests directly on the layer of insulation 66 on the partition. The burner has a central axial hole 80 into which a fuel mixture pipe 82 leads. The fuel from the pipe passes through a nozzle 83 onto the upper firing surface of the refractory element. The description of the device hereinbelow is now directed principally to the fuel mixing component in the lower compartment, from which the fuel mixture passes through the pipe 82 and through the nozzle 83 to the burner.

The heating operation includes a fuel pre-mix step, the fuel mixture being forced to the burner. Such fuel mixture component includes a blower 88 (FIGS. 3–5), as referred to in the cross reference application. This blower is driven by a motor 90, and has an air inlet 91 and an air outlet 92. The air for the blower is drawn in from the space surrounding the cooker, through a suitable inlet 94, or if desired under the casing as at 95 (FIG. 2), the casing in this case being raised for providing such space.

For controlling the air control of the blower (FIG. 9), is a valve closer 97 mounted on a shaft 98, coaxial with the blower. The valve closer is moved by a servo motor 100 to correspondingly shut down and open up the inlet to the blower, for controlling the amount of air driven through the blower.

The outlet 92 of the blower leads to a manifold 102 (FIG. 4) which includes a pipe 103. The pipe is of substantial dimensions, in both length and diameter, for providing the desired flow of gases, including air and fuel mixture in succession. The pipe is designed for fitting in a relatively small space in the casing, despite its great size. The pipe is made up of three sections, 103a, 103b, 103c, butted together and secured together to form a continuous pipe. The first section 103a is straight, leading from the blower, the second section 103b is of U-shape, to provide compactness for accommodating the space provided, and the section 103c is the terminal section, leading to the mixer. (see below)

The manifold includes a novel mixer unit 104 (FIGS. 4, 7 and 8), which itself includes an outer pipe section 107, located in a joint 105 between the sections 103a, 103b. The unit also includes, is an integral tubular mixer element of steel, i.e. pipe 107a, with a central reduced diameter element 106 having a plurality of radial holes 108, such as twelve in number. Leading from the central element axially in opposite directions are diverging tubular elements 110, terminating in axially outwardly terminal elements 111 which are of cylindrical shape on their outer surface.

This mixer element is placed within the pipe, at the joint, and the terminal elements 111 engage the inner surface of the pipe section 107, and are welded thereto. The central portion of the mixer, with the pipe, forms an annular space 113, surrounding the mixer element within the pipe, and communicating with the holes 108 for flow of gas therethrough as referred to again hereinbelow.

The other sections 103b, 103c are secured to adjacent sections by welding, and the sections form a unitary, and effectively integral manifold pipe.

The section 103c of the manifold pipe continues to a terminal end 114 where it is connected with the vertical burner pipe 82, at 115, as by welding, providing a sealed continuous passage from the manifold pipe to the pipe 82. Thus a continuous passage is provided from the outlet of the blower to the burner.

A fuel inlet pipe 116 is provided having an inlet end 116a for connection with a supply of fuel, in this case natural gas. The burner is not limited to natural gas but may be used with any gaseous or vaporized fuel. This fuel pipe continues to the manifold pipe, where its terminal end 117 is connected with the manifold pipe and leads into the space 113 surrounding the mixer in the manifold pipe. The condition of the gas, as it flows through the fuel inlet pipe 116, will be referred to again hereinbelow, but the restricted central portion of the mixer provides lower pressure and draws the fuel through the holes 108 into the stream of air provided by the blower. This provides the usual fuel/air mixture.

Interposed in the gas supply line is a gas regulator 119 for controlling the pressure of the gas as it is received from the source, and producing a predetermined constant pressure thereof. Also interposed in the gas line, downstream from the gas regulator 119, is a zero governor 121. This zero governor is operable for predetermining the pressure of the gas at the outlet of the fuel line, made possible by the regulation of the gas pressure by the gas regulator, the outlet of the zero governor being zero, or substantially so. Upon control of the flow of air from the blower into the manifold pipe, the desired gas from the gas line is picked up by inspiration effect according to the pressures in both the manifold pipe and the fuel pipe. The pressures involved in the immediately foregoing description, produce an immediate effect on the gas being applied to the burner refractory. This rate of supply of the fuel mixture is indeed critical, and as referred above, a desired rapid cooking of the candy is desired, but as is well known too great temperature can burn the candy, and the present device overcomes that danger, because of the effectiveness of the controls for controlling the air and fuel. This fine control is of extreme importance and effectiveness in considering the great capacities of the elements and components of the apparatus.

While the temperatures involved in the upper compartment are considerable in view of the cooking of the candy, it is necessary that the temperatures in the lower compartment be held down to low levels. For this purpose, exhaust units 123 (FIG. 10) are provided. Each unit includes holes 124 in the skin of the casing, and an exhaust blower 126 driven by a motor 127.

In the making of candy in a commercial operation, relatively great quantities of heat are required at times. A large batch of candy is placed in the kettle, and after the cooking step the kettle is lifted out and carried to another location where a processing step on the candy is performed. Then another kettle with a batch therein is placed in the cooker for a repeated heating step. In such a commercial operation, where large quantities of candy are produced, great amount of heat is applied to the kettle, and it is desired to cook the candy quickly for efficiency purposes, but in so applying a large amount of heat, there is danger of burning the candy, and the heat must immediately be reduced and controlled. This apparatus therefore enables such great quantities to be produced and controlled.

The heated air can be transmitted to other areas, as through ducts 68, after performing the function of heating the candy batch, and used for other heating purposes.

Thus the character of the apparatus is such that other components and units can be added on to an original basic unit, for utilizing great quantities of heat.

I claim:

1. A gas power plant comprising, a casing having an upper compartment and a lower compartment, and having a top opening for receiving a kettle therein in a cooking position in which it extends down into the upper compartment, a burner unit in the upper compartment under the kettle when the latter is in cooking position, a mixing unit in the lower compartment for providing a fuel supply and fuel/air mixture and forcing it to the burner unit, the mixing unit including an air blower, a manifold pipe leading from the blower into the upper compartment and into the burner unit and having an outlet end in operable position in the burner unit, a mixer enclosed in the manifold pipe and having a longitudinal passage therethrough extending longitudinally of the manifold pipe, the manifold pipe and mixer being relatively proportioned for forming a space surrounding the mixer, and a fuel line leading into said space surrounding the mixer.

2. A gas power plant according to claim 1 wherein, the manifold pipe includes sections meeting at a joint, and the mixer is positioned in the joint and has end elements secured to the respective sections of the manifold pipe and are operable for securing them together thereby forming a longitudinally continuous and rigid member.

3. A gas power plant according to claim 2 wherein, the end elements of the mixer are tubular, cylindrical and snugly tightly in the sections of the manifold pipe, and the mixer also has a perforated mid-section of reduced diameter, thereby forming said space.

4. A gas power plant according to claim 3, wherein, the end elements of the mixer are of substantial length and thereby provide effective double thickness of the manifold pipe, and corresponding great strength and rigidity to the manifold pipe.

5. A gas power plant comprising, a casing having a transverse partition forming an upper compartment and a lower compartment in the casing, the casing having a top opening for receiving a kettle therein and the opening being substantially closed when the kettle is positioned therein, the casing also having an exhaust air duct leading from the upper compartment, a pressure burner in the upper compartment and having a fuel passage leading from the lower compartment, a blower in the lower compartment operable for driving fuel through the fuel passage and into the pressure burner, the upper compartment being effectively closed, except for the exhaust duct, when the kettle is positioned in the top opening and the burner is operating, whereby heated gases from the upper compartment can be controllably driven only through the exhaust duct to predetermined locations.

6. A gas power plant according to claim 5 wherein, the air blower constitutes the sole means for pressure transmitting gases, and is operable for so transmitting the gases into and through the exhaust duct.

7. A gas power plant according to claim 5 wherein, the pressure burner includes a refractory element resting directly on and supported by said partition.

8. A gas power plant according to claim 7 wherein, the casing includes a heat insulation liner on the wall of the upper compartment and a heat insulation mat on the partition under the refractory burner member.

9. A gas power plant according to claim 5 and including, exhaust units in the lower compartment including holes in the casing to the exterior, and exhaust blower means for exhausting heated air from the lower compartment to the exterior.

* * * * *